Figure 1:
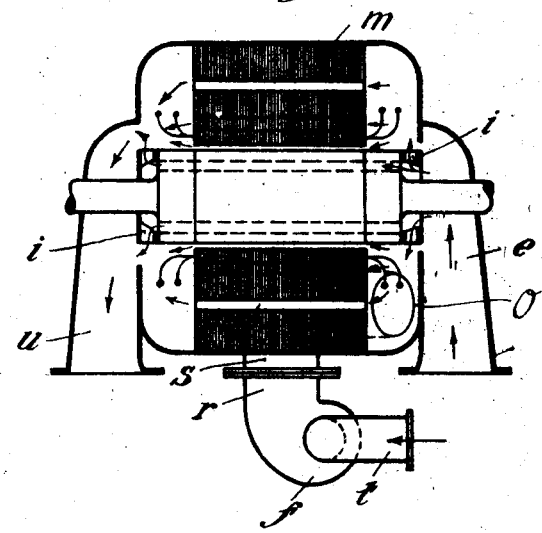

Sept. 7, 1926.

R. RÜDENBERG 1,599,065

COOLING OF ELECTRIC MACHINES

Original Filed August 23, 1921

Inventor
Reinhold Rüdenberg
by Knight Bros
Attorneys

Patented Sept. 7, 1926.

1,599,065

UNITED STATES PATENT OFFICE.

REINHOLD RÜDENBERG, OF BERLIN-CHARLOTTENBURG, GERMANY, ASSIGNOR TO SIEMENS-SCHUCKERTWERKE GESELLSCHAFT MIT BESCHRANKTER HAFTUNG, OF SIEMENSSTADT, NEAR BERLIN, A CORPORATION OF GERMANY.

COOLING OF ELECTRIC MACHINES.

Original application filed August 23, 1921, Serial No. 494,546, and in Germany October 7, 1918. Divided and this application filed September 16, 1924. Serial No. 738,082.

My invention refers to the cooling of electric machines and its particular object is to improve the output of such machines by improving the means for cooling them.

Such machines are constructed as a rule for a definite normal load or output and provided with a definite amount of positive (i. e. power driven) ventilation for cooling purposes, which must be of sufficient dimensions to suffice for the maximum continuously required. This positive ventilation is usually embodied in the machine casing in the form of fan blades mounted in well known manner on the machine shaft.

Arrangements are also known for automatically controlling the supply of cooling air to a dynamo-electric machine by means of a thermostatic device affected by the temperature of the machine so as to give a supply appropriate to the needs of the latter.

In many cases however, the maximum load or output just referred to occurs (for example in central stations) only during a few hours of the day, and at that perhaps only during a few winter months, and therefore the machinery is underloaded or only imperfectly utilized at all other times.

This imperfect utilization of the machinery is obviated according to the invention, by running the machinery normally up to a load at which it reaches the permissible limit of temperature, the case of extreme output being provided for by a supplementary or extraneous ventilation added to the ordinary normal ventilation.

This extraneous ventilation is produced by external fans or ventilators and conveyed into the machine.

Thus as regards the utilization of the machines, similar conditions prevail in working as exist for example in the case of steam turbines, which are fully loaded for economical utilization in the normal working, and to which fresh or live steam may be supplied for extreme outputs, thereby attaining a larger output, although with a lesser degree of efficiency.

Particularly favorable conditions in the ventilation of the machine are attained if within the load range normal or rated load and peak or excess load the air pressure produced by self-ventilating means is kept constant. This is then of importance if the fan which produces the separate or auxiliary ventilation for the period of the excess or peak loads works parallel with the self-ventilating means or the fan on the machine shaft.

In order that the invention may be clearly understood and readily carried into effect reference will now be had by way of example to the accompanying schematic drawings in which:—

Figure 2:
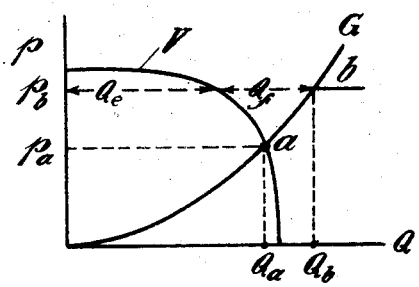

Fig. 1 is a construction in which the separate or auxiliary fan works parallel with the self-ventilation fan of the machine, and Fig. 2 a diagram corresponding with this manner of operation.

Referring to Fig. 1, $m$ is the casing of the electric machine which is provided with a self-ventilating fan $i$ and a separate or auxiliary fan $f$. $e$ is the inlet and $u$ the outlet for the cooling air. $t$ is the inlet for the separate fan and $r$ the corresponding outlet. The separate fan opens into the connecting pipe $s$. From there the cooling air of the separate fan $f$ enters into the casing of the electric machine at $o$ and mixes with the current of cooling air produced by the self-ventilating fan.

In the arrangement according to Fig. 1 the self-ventilator or internal fan $i$ and the separate or external fan $f$ thus work in parallel to each other. In this case the danger arises that the self-ventilating fan falls off in its supply owing to the increased pressure which must be overcome when a larger quantity of cooling air is passed through the machine in case of overloads.

According to my invention this can be avoided by so dimensioning the self-ventilator that it supplies approximately the same quantity of air at the air pressure which corresponds with the rated load as well as at overloads.

The characteristic between the air pressure and the quantity of air of the ventilator will within this range be substantially vertical as shown in the diagram Fig. 2.

The curve G in Fig. 2 shows in dependence from the quantity of cooling air Q flowing through the machine the air pressure P to be expended therefore which increases approximately as the square of the quantity of air. The curve V shows the characteristic of the self-ventilator, that is to say the relationship of its air pressure to the quantity of cooling air it will deliver. The point of intersection $a$ between the ventilator characteristic and the resistance curve corresponds to the normal working point. Suppose that in the case of an extreme output, the point $b$ of the curve G corresponds to the adequate cooling of the machine. A pressure $P_b$ must be applied, in order to force through the generator the necessary quantity of air $Q_b$ against the resistance in the air ducts of the generator, this quantity $Q_b$ being made up of the quantity $Q_a$ due to the primary ventilator and the quantity $Q_f$ due to the auxiliary ventilator, both ventilators now working under the same pressure.

If now the ventilator characteristic V drops steeply or vertically within the range of pressure necessary for the passage of the cooling air through the machine, the ordinary ventilator still delivers approximately the same or its maximum volume of air under the altered conditions and is thus fully or economically utilized, whilst the auxiliary ventilator supplies the extra volume $Q_f$.

For the separate ventilation according to the invention it is essential that the self-ventilator is from the beginning so dimensioned that it can supply the higher pressure without an excessive drop in the quantity of the air when it operates in parallel with the separate fan.

I am aware that arrangements for controlling the temperature of dynamo electric machinery either automatically or thermostatically have been proposed before, and I do not claim such per se.

What I claim as my invention and desire to secure by Letters Patent is:—

In electric machines in combination, self-ventilating means dimensioned for the normal load of said machine only and separate ventilating means adapted to operate parallel with said self-ventilating means to supply ventilation for excess machine loads, said self-ventilating means being adapted to furnish constantly approximately the same air volume within the limits of normal and excess load, the ventilating currents of both ventilating means passing in common thru the machine.

In testimony whereof I affix my signature.

REINHOLD RÜDENBERG.